United States Patent

[11] 3,586,129

| [72] | Inventor | Richard Cass |
| | | Birmingham, Mich. |
| [21] | Appl. No. | 839,288 |
| [22] | Filed | July 7, 1969 |
| [45] | Patented | June 22, 1971 |
| [73] | Assignee | THW Inc. |
| | | Cleveland, Ohio |

[54] METERING DEVICE
9 Claims, 8 Drawing Figs.

[52] U.S. Cl. .................................................. 184/7,
184/27, 184/34, 417/469, 417/509
[51] Int. Cl. .................................................. F16n 13/16
[50] Field of Search ........................................... 103/44, 49,
158, 227; 417/466, 469, 518; 184/27, 27 E, 7 C,
34; 417/509

[56] References Cited
UNITED STATES PATENTS

| 2,886,132 | 5/1959 | Gittinger et al. ............... | 184/1 |
| 2,007,156 | 7/1935 | Burrell ........................... | 184/7 |
| 2,168,937 | 8/1939 | Hillis ............................. | 184/7 X |
| 2,410,517 | 11/1946 | Muller et al. .................. | 417/469 |
| 2,667,129 | 1/1954 | Graner .......................... | 103/227 X |
| 2,826,267 | 3/1958 | Lipinski ......................... | 417/469 |
| 3,259,077 | 7/1966 | Wiley et al. ................... | 103/227 |
| 3,301,196 | 1/1967 | Glas .............................. | 103/158 |
| 3,422,926 | 1/1969 | Stanaway ...................... | 103/158 X |

*Primary Examiner*—Manuel A. Antonakas
*Attorney*—Hill, Sherman, Meroni, Gross & Simpson ABSTRACT: A fluid measuring device for automatically dispensing a fixed quantity of fluid such as grease to components such as ball joints for wheel suspension and steering linkages. The device includes a ported housing, a ported sleeve slidable in the housing, a double acting piston slidable in the sleeve, a single power source driving the piston, and stop for the sleeve and piston controlling relative movement thereof for effecting a metered discharge from the housing.

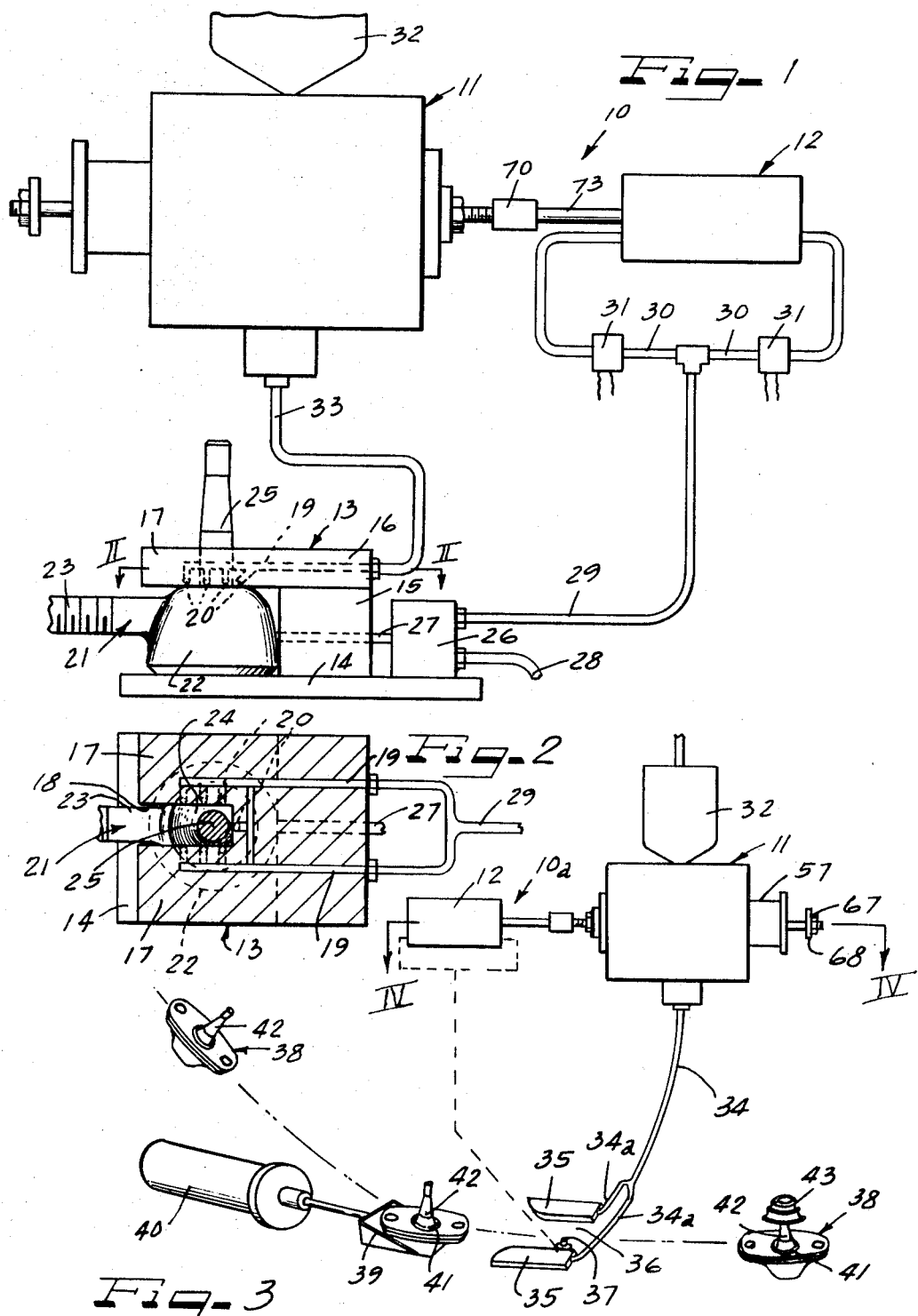

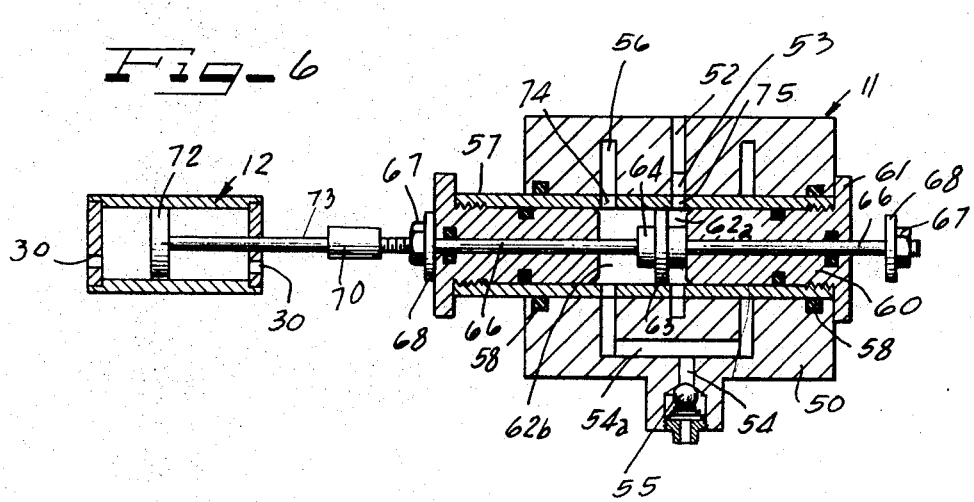
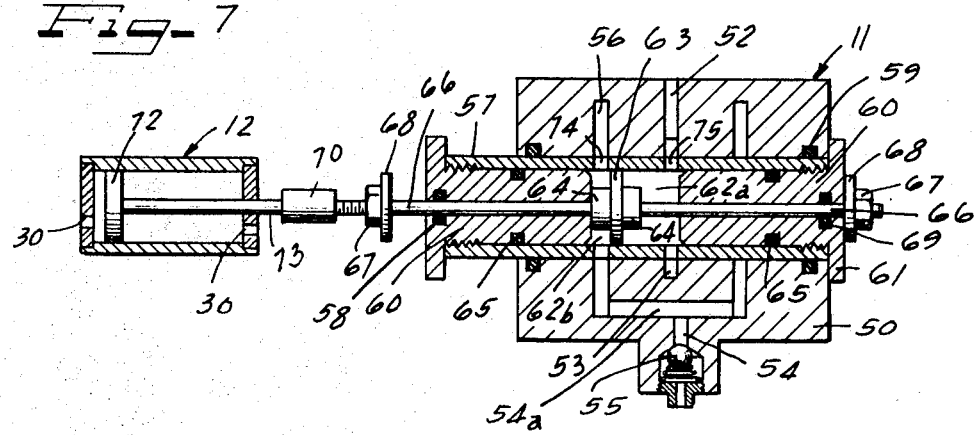
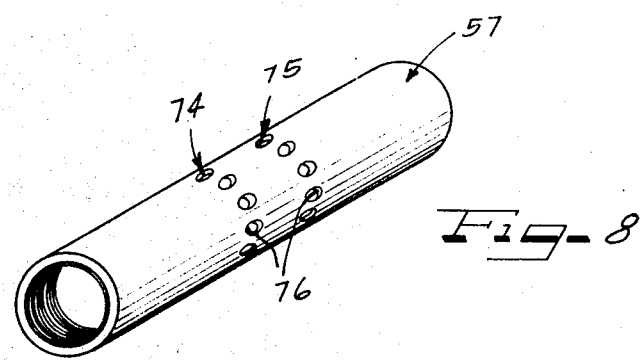

3,586,129

METERING DEVICE

BACKGROUND OF THE INVENTION

1. Field of the Invention

This invention pertains to the art of dispensing accurate, predetermined amounts of fluid, regardless of the viscosity thereof and, more specifically, relates to apparatus for successively and rapidly feeding predetermined amounts of grease to joint parts, such as ball and socket joints for wheel suspensions for automotive vehicles, steering linkages, and the like.

2. Description of the Prior Art

Greased-for-life assemblies, such as ball-and-socket joints, have heretofore been initially charged with grease on a visual application basis which depended entirely upon the individual skill of an assembler. Heretofore available grease guns or applicator tools were insensitive to viscosity conditions, and even though an operator developed a skilled sense of timing and observing the discharge from such guns and tools, it has been impossible to successively deliver the exact desired amount of grease to the ball joints on any economic production schedule. As a result, the greased-for-life assemblies were not uniform, much expensive grease was wasted, and assemblies without a sufficient grease supply would not function properly and soon wore out.

SUMMARY OF THE INVENTION

This invention now provides for the automatic dispensing of exact successive amounts of fluid, such as grease, to partially assembled units on a high-production rate basis without requiring the services of skilled technicians. The devices of this invention measure an automatically dispensed, fixed quantity of fluid each time they are actuated, and this quantity will not vary with variations in viscosity of the fluid.

The devices of this invention include a double-acting piston and cylinder arrangement with an integral hydraulic valve system. The devices of this invention are actuated from a quick-acting power source, such as a pneumatic motor. The fluid measuring devices can be easily and quickly adjusted to vary the amount of fluid dispensed on each actuation thereof, and once so adjusted, they will operate over long periods of time to deliver the exact same amount of fluid each time they are actuated, even though the viscosity or flowability of the fluid being dispensed varies greatly.

In the preferred embodiment the device of this invention includes a housing slidably mounting a sleeve, with stops on the opposite ends thereof to limit the extent of travel of the sleeve in the housing, and with a double-acting piston slidably mounted in the sleeve and dividing the sleeve into two compartments. Passageways in the housing and ports in the sleeve selectively join one compartment to an inlet, while the other is in communication with an outlet. An air-actuated reciprocating motor is coupled with the piston, and the arrangement is such that when the piston is moved in one direction, the fluid in the chamber ahead of the piston will cause the sleeve to move with the piston until a stop on the sleeve prevents such movement, whereupon the piston will slide in the sleeve and discharge the fluid ahead of it to the outlet. At the same time, the compartment in the sleeve behind the piston is in communication with an inlet, and is charged with fluid, Reverse movement of the air motor will then effect comovement of the piston and sleeve until the opposite stop prevents further movement of the sleeve, whereupon the discharge and filling cycles are repeated. Adjustable stops can be provided to limit the movement of the piston in the sleeve, and thereby control the amount of intake and discharge. The sliding sleeve cooperates with the passages in the housing to provide positive hydraulic valve control between inlet and outlet passages. Since the stroke of the piston in the sleeve can be positively controlled, and since the fluid ahead of the piston is trapped in the sleeve and pressed by the piston during its travel to the outlet, whereupon discharge from the compartment is by positive displacement, an exact predetermined volume of fluid will be discharged on every stroke, regardless of the flowability of the fluid. A check valve is provided in the outlet discharge to maintain a back pressure and prevent drainage from the outlet.

It is then an object of this invention to provide a positive displacement fluid-metering device which will successively deliver exact predetermined amounts of fluid, regardless of the viscosity of the fluid.

Another object of this invention is to provide a positive displacement fluid-metering device which traps and compacts a charge to be dispensed, and then discharges an exact predetermined volume from this charge.

Another object of this invention is to provide a fluid measuring device for dispensing grease in fixed quantities in rapid succession to assemblies.

Another object of this invention is to provide a ball joint greasing machine which will successively and rapidly dispense fixed quantities of grease, regardless of variations in viscosity of the grease.

Another object of this invention is to provide a machine which will rapidly discharge measured volumes of fluid in quick succession to greased-for-life assemblies for ensuring uniformity of the assembled products.

Another object of this invention is to provide a grease-metering machine which is tripped by components to be greased and which will deliver a fixed, predetermined quantity of grease to the components regardless of variations in grease viscosity.

Other objects, features and advantages of this invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a somewhat diagrammatic elevational view of a machine for successively metering fixed quantities of grease to the throat openings of ball and socket joints whenever the joint trips an actuator;

FIG. 2 is a horizontal cross-sectional view taken along the line II—II of FIG. 1;

FIG. 3 is a somewhat diagrammatic view illustrating another installation of machines of this invention for successively depositing fixed amounts of grease into the throats of ball-and-socket joints before the seal is attached to the joint;

FIG. 6 is a view similar to FIG. 5, but illustrating the position of the metering unit components at the initiation of discharge of fluid on the left-hand side of the piston;

FIG. 7 is a view similar to FIG. 6, but showing the position of the components of the metering unit at the completion of the stroke to the left;

FIG. 8 is a perspective view of the sleeve of the metering device illustrating the axially spaced circumferential rings of ports.

DESCRIPTION OF THE PREFERRED EMBODIMENTS

Figure 4:
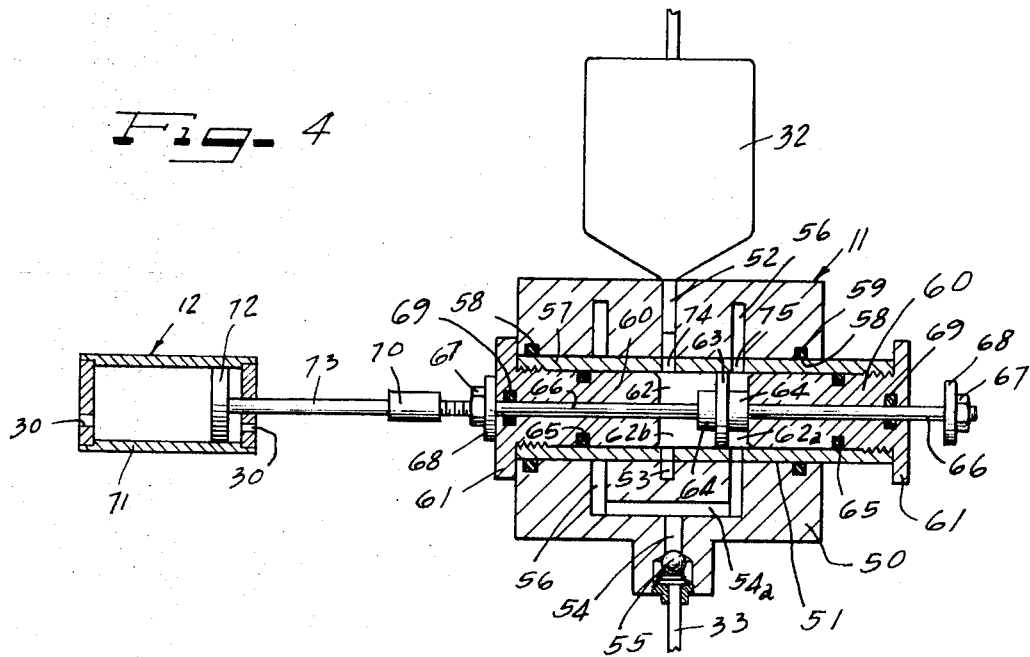
FIG. 4 is a cross-sectional view taken generally along the line IV—IV of FIG. 3 and showing the position of the metering unit at the right-hand end of its stroke after discharge has been completed.

The machine 10 of FIG. 1 includes a metering unit 11, an air motor 12, and a fixture 13. The fixture 13, as shown in FIGS. 1 and 2, has a base 14 on which is mounted a block 15 supporting on the top thereof a plate 16, with a bifurcated end having fingers 17, 17 providing therebetween a recess 18 open at the outer end. The plate 16 has passages 19 therein communicating with discharge orifices 20 in both fingers 17 opening into the recess 18. A ball-and-socket tie rod end 21 has the housing 22 thereof seated on the base 14, with the stem 23 projecting forwardly from the housing away from the plate 13. The housing 22 has an open top or throat 24, from which projects the shank 25 of the ball stud, which is tiltably and rotatably mounted in the housing 22. As shown in FIG. 2, the throat 24 is aligned in the recess 18 under the discharge orifices 20 to receive grease therefrom.

An air valve 26 is mounted on the base 14 behind the block 15, and is tripped by a plunger finger 27 extending through the block to be engaged by the housing 22. The valve 26 supplies air from a source tube 28 to a tube 29, which is connected through branch tubes 30 with opposite ends of the air motor 12. Electrically operated valves 31 are provided in each branch tube 30, and are automatically triggered so as to reverse the air motor at the ends of its stroke.

Grease to be dispensed to the throat 24 of the ball joint 21 is fed from a supply hopper or tank 32 to the metering device 11, and from the metering device through a tube 33 to the passages in the plate 16.

As will be more fully hereinafter described, the machine 10 discharges a predetermined measured quantity of grease to the throat 24 on each stroke of the air motor 12.

In the modified arrangement 10a of FIG. 3 parts identical with parts described in FIG. 1 are marked with the same reference numerals. As shown in FIG. 3, the metering device 11 supplies the grease through a tube 34 and branch tubes 34a to fingers 35 in spaced relation, providing a path 36 therebetween. An air switch 37 is mounted below the path 36 between the fingers 35, and controls the operation of the air motor 12. Wheel suspension ball joints 38 from an assembly line production are received successively by a carriage 39 actuated by an air motor 40 to move the unit through the throat or passageway 36 between the fingers 35, whereupon grease ejected from orifices in the fingers will be deposited in the throats 41 of the units 38 around the studs 42 thereof, and the air motor 12 will be actuated by contact of the units 38 with the switch 37. After passage through the throat or passageway 36, boot seals such as 43 will be applied to the units 38 around the ball studs 42 thereof to seal the throats 41.

It will be appreciated that many different arrangements of stations for receiving the units to be greased can be provided for the metering device of this invention, and the arrangements in FIGS. 1—3 are only exemplary.

As shown in FIG. 4, the metering device 11 includes a housing 50 with a horizontal cylindrical bore 51 therethrough. The housing has an inlet passage or bore 52 communicating with the supply tank 32, and with an annular groove 53 around the bore 51 midway between the ends of the bore.

The housing 50 has an outlet passage 54 with a check valve 55 therein discharging to the tube 33 or 34 which feeds the fingers 17 or 35 of FIGS. 1 and 3. The passage 54 is connected through branch passages 54a, each of which, in turn, communicate with annular grooves 56 in the bore 51. The grooves 56 are equally spaced on opposite sides of the groove 53.

A cylindrical sleeve 57 is slidably mounted in the bore 51 and sealed relative to the bore by O-ring seals 58 seated in grooves 59 in the bore outwardly from the grooves 56.

The sleeve 57 has plugs 60 threaded into opposite ends thereof, and provided with heads 61 adapted to abut the end faces of the housing 50, as will be more fully hereinafter described. The plugs 60 terminate in spaced opposed relation in the central portion of the sleeve 57 to provide therebetween a chamber 62 in the midportion of the sleeve.

A piston 63 is slidably mounted in the sleeve between the plugs 60, and divides the chamber 62 into separated compartments on opposite sides of the piston, including a right-hand compartment 62a and a left-hand compartment 62b. The piston 63 has boss portions 64 on opposite sides thereof adapted to engage the inner ends of the plugs 60 at the opposite ends of the stroke of the piston. The piston is sealably engaged with the bore of the sleeve 57 so that the compartments 62a and 62b do not communicate. O-ring seals 65 are provided in grooves in the plugs 60 to sealably engage the inner bore of the sleeve 57 and prevent leakage from the compartments 62a and 62b.

Piston rods 66 extend from opposite ends of the piston 63, and are slidably mounted in the plugs 60. The rods 66 have threaded ends projecting beyond the ends of the housing 50. Nuts 67 are threaded on these ends and abut collars or washers 68, which may engage the heads 61 of the plugs at the opposite ends of the stroke of the piston.

O-ring seals 69 provided in grooves in the head ends of the plugs sealably engage the piston rods 66 to prevent leakage through the plugs along the rods.

One piston rod 66 is connected through a coupling 70 with the air motor 12. This air motor has a cylinder 71 receiving air from the branch tubes 30, such as shown in FIG. 1, to drive the piston head 72 thereof in opposite directions in the cylinder. A piston rod 73 extends from the piston head 72 through one end of the cylinder to be connected to the coupling 70.

In the position shown in FIG. 4 the sleeve 57 is at the right-hand end of its stroke. In this position the inlet groove 53 is aligned with a first ring of ports 74 through the sleeve, while a second ring of ports 75 is aligned with the right-hand outlet groove 56. As shown in FIG. 8, the sleeve 57 has axially spaced rings of ports 74 and 75, with each ring being composed of a plurality of circumferentially spaced holes 76 extending radially through the sleeve at spaced intervals around the entire sleeve circumference.

In the position of FIG. 4, grease from the supply tank 32 has filled the compartment 62b on the left side of the piston head 63, while grease from the compartment 62a has been ejected through the ports 75 and right-hand passage 56 to the outlet 54. As shown, the head 61 of the left-hand plug 60 is bottomed against the left side of the housing 50, and the boss 64 of the piston 63 is bottomed against the right-hand plug 60. The piston 72 of the air motor 12 is at the right-hand end of its stroke.

Figure 5:
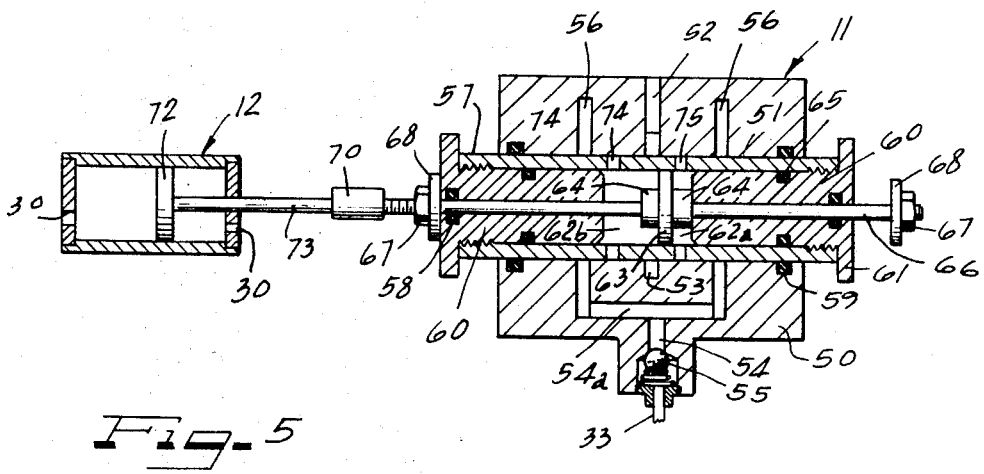
FIG. 5 is a view similar to FIG. 4, but showing the position of the metering unit components midway of its stroke to the left with all ports closed.

As shown in FIG. 5, as the air motor 12 is energized to move its piston 72 to the left to a position about midway of its stroke, grease in the compartment 62b between the piston head 63 and the left-hand plug 60 will cause the sleeve 57 to move with the piston. In the midway position of FIG. 5, therefore, the ports 74 and 75 of the sleeve are closed by the bore 51, and the grease in the compartment 62b is trapped. The piston head 63 will compact this trapped grease to eliminate any voids in the charge so that the compartment 62b is completely filled with grease.

As the piston 72 of the air motor 12 continues to move to the left from the position of FIG. 5 to the position of FIG. 6, where it has pulled the sleeve 57 to the left-hand end of its stroke, with the head 61 of the right-hand plug 60 bottomed against the right-hand end of the housing 50, the ports 74 will be in registration with the left-hand outlet groove 56, and the ports 75 will be in registration with the inlet 53. Thus, the compartment 62b is free to discharge, while the compartment 62a is free to receive grease from the inlet 53.

As the air motor 12 moves the piston 72 further to the left to the left-hand extremity of its stroke, as shown in FIG. 7, the sleeve 57 having already previously reached the end of its left-hand stroke, cannot further move to the left with the piston 63, and the piston will thereupon be pulled to decrease the compartment 62b and to increase the compartment 62a, thereby discharging the grease ahead of the piston to the outlet 56 and drawing a fresh charge of grease from the inlet 53 into the expanding compartment 62a. As shown in FIG. 7, the piston boss 64 is bottomed on the left-hand plug 60, indicating that the piston has also reached the left-hand end of its stroke.

If it is desired to decrease the effective sizes of the compartments 62a and 62b, the nuts 67 can be further threaded onto the piston rod 66 to cause the washers to engage the heads 61 of the plugs before the bosses 64 engage the plugs. Therefore, the stroke of the piston 63 in the sleeve 57 can be decreased to lessen the size of the charge from the contracting chamber compartment.

From the above descriptions it will therefore be understood that the air motor first moves the piston 63 and the sleeve 57 as a unit until the sleeve is bottomed on the housing, whereupon the piston will move in the sleeve to expand one compartment for drawing in grease and to contract the other compartment for discharging grease. The discharged grease is fed under pressure through the outlet 54 to the check valve 55, which maintains a back pressure on the grease and ensures maintenance of grease-filled passages on the discharge side of the unit.

The electrically actuated valves 31, illustrated in FIG. 1, can be automatically switched by the piston 72 when it reaches the end of its stroke so that the machine will be ready for the next operation on a reverse stroke, all, of course, under the control of the tripping plunger, such as 27, for the main air valve 26.

From the above descriptions it will therefore be understood that this invention provides a positive displacement metering device for discharging, in rapid succession, individual charges of a fixed amount of fluid, regardless of the viscosity of the fluid.

I claim as my invention:

1. A machine for discharging accurately controlled amounts of grease to the throats of ball joints and the like which comprises a fixture for receiving the throat of a ball joint having grease discharge orifices automatically aligned with the throat when the fixture receives the ball joint, a grease-metering unit for successively supplying said orifices with a fixed charge of grease, said metering unit including a slidable ported sleeve receiving grease from a source and discharging grease to said orifices, a piston slidable in said sleeve effecting drawing of grease into the sleeve from the source and discharge of grease out of the sleeve to the orifices, a double-acting piston air motor connected to the piston in said sleeve, stops limiting the stroke of said sleeve, stops limiting the stroke of said piston in said sleeve, said sleeve being movable with said piston therein to trap and compact grease in the sleeve ahead of the piston, said stops for the sleeve coacting with ports in the sleeve to discharge the trapped grease from the sleeve and to draw grease into the sleeve when the piston in the sleeve moves relative thereto, and said stops on the piston controlling the stroke of the piston in the sleeve to regulate the amount of grease discharged on each stroke.

2. The machine of claim 1, including a switch in the fixture tripped by a ball joint in proper position in the fixture for receiving grease in the throat thereof to actuate the air motor.

3. The machine of claim 1 wherein the fixture includes a pair of orificed fingers straddling the stud of the ball joint inserted therein, with the orifices directed to discharge into the throat of the ball joint.

4. A metering machine for successively and rapidly dispensing exact predetermined quantities of fluids regardless of the viscosity thereof which comprises a housing having a bore, an inlet passage communicating with said bore, and a pair of outlet passages communicating with said bore in equally spaced relation from opposite sides of said inlet passage, a sleeve slidable in said bore, plugs in opposed relation in said sleeve defining therebetween a fixed volume chamber, axially spaced ports in said sleeve, each joining said chamber selectively with said inlet passage and with one of said outlet passages, a piston slidable in said sleeve between said plugs dividing the chamber into two compartments, piston rods slidable through said plugs extending from opposite sides of the piston, stops on said rods each engageable with the adjacent plug, an actuator connected to one rod to selectively slide the sleeve in opposite directions in the bore through a drive connection created by the piston and fluid trapped in the compartment ahead of the piston, stops on said sleeve limiting the stroke thereof in said bore to effect movement of the piston in the sleeve upon continued driving by the actuator, said stops on said rods limiting the stroke of said piston in said sleeve, and movement of the piston in the sleeve effective to eject fluid ahead of the piston through the sleeve ports to an outlet and to draw fluid from the inlet through the sleeve ports into the compartment behind the piston whereby each stroke of the metering machine will discharge positively a fixed amount of fluid ahead of the piston in the sleeve and will draw the next charge of fluid into the sleeve behind the piston.

5. A grease-dispensing machine for assembly line installation in the production of ball joints to ensure accurate predetermined grease charges in each ball joint which comprises a station with a grease discharge orifice and means to align the throats of ball joints with said orifice, an air motor driven grease-metering unit, means at said station actuating the air motor when a ball joint at the station has its throat aligned with the orifice, said unit including a double-acting cylinder and piston and a hydraulic valve system controlled by the cylinder, said cylinder being slidable in a ported housing and said piston being slidable in said cylinder, each stroke of the cylinder shifting the communication of the piston with the ports and each stroke of the piston in the cylinder discharging the predetermined amount of grease from the cylinder and drawing in a new charge of grease into the cylinder.

6. A fluid-dispensing unit comprising a housing having a bore with an inlet port and two outlet ports, a cylinder slidable in the bore having a central chamber and ports selectively communicating the inlet and outlet ports with said chamber, a piston slidable in the cylinder dividing the chamber into opposed compartments receiving fluid to be dispensed from the inlet port and means driving the piston in opposite directions to first drive the cylinder through the fluid ahead of the piston for shifting port communication and to then drive the piston in the cylinder for discharging the fluid ahead of the piston to an outlet port while simultaneously drawing fluid into the chamber behind the piston from the inlet port.

7. The fluid-dispensing unit of claim 6 including means limiting the stroke of the cylinder in the housing in advance of the end of the stroke of the piston and means limiting the stroke of the piston in the cylinder to control the discharge of the fluid.

8. The unit of claim 7 wherein the means limiting the stroke of the piston is adjustable from outside of the unit.

9. The fluid-dispensing unit of claim 6 wherein the two outlet ports communicate with a fixture equipped with means actuated by the device to receive the fluid for controlling the means driving the piston.